June 20, 1939.  R. N. RIBLET  2,163,061
CHUTE AND VALVE
Filed Nov. 1, 1937  2 Sheets-Sheet 1
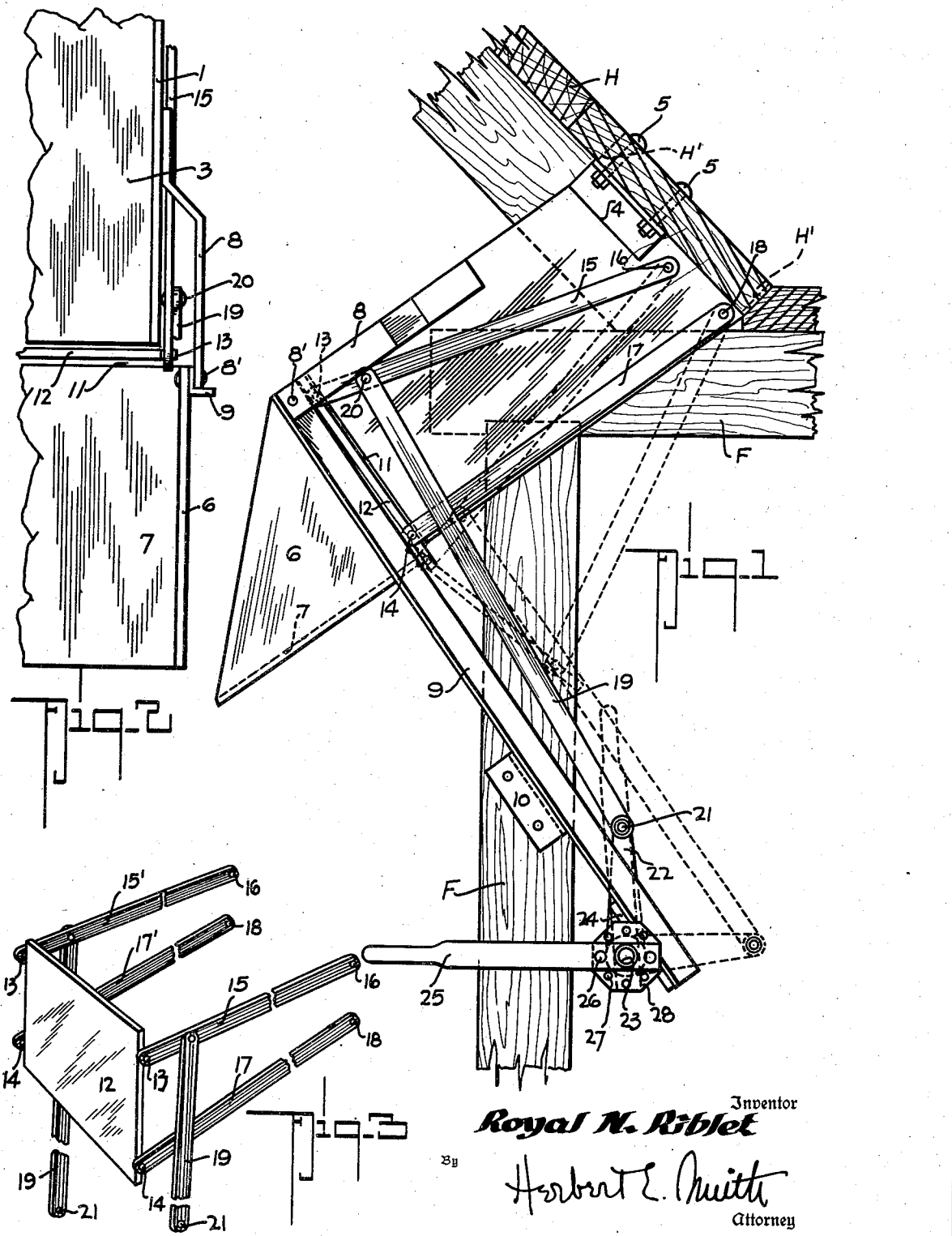

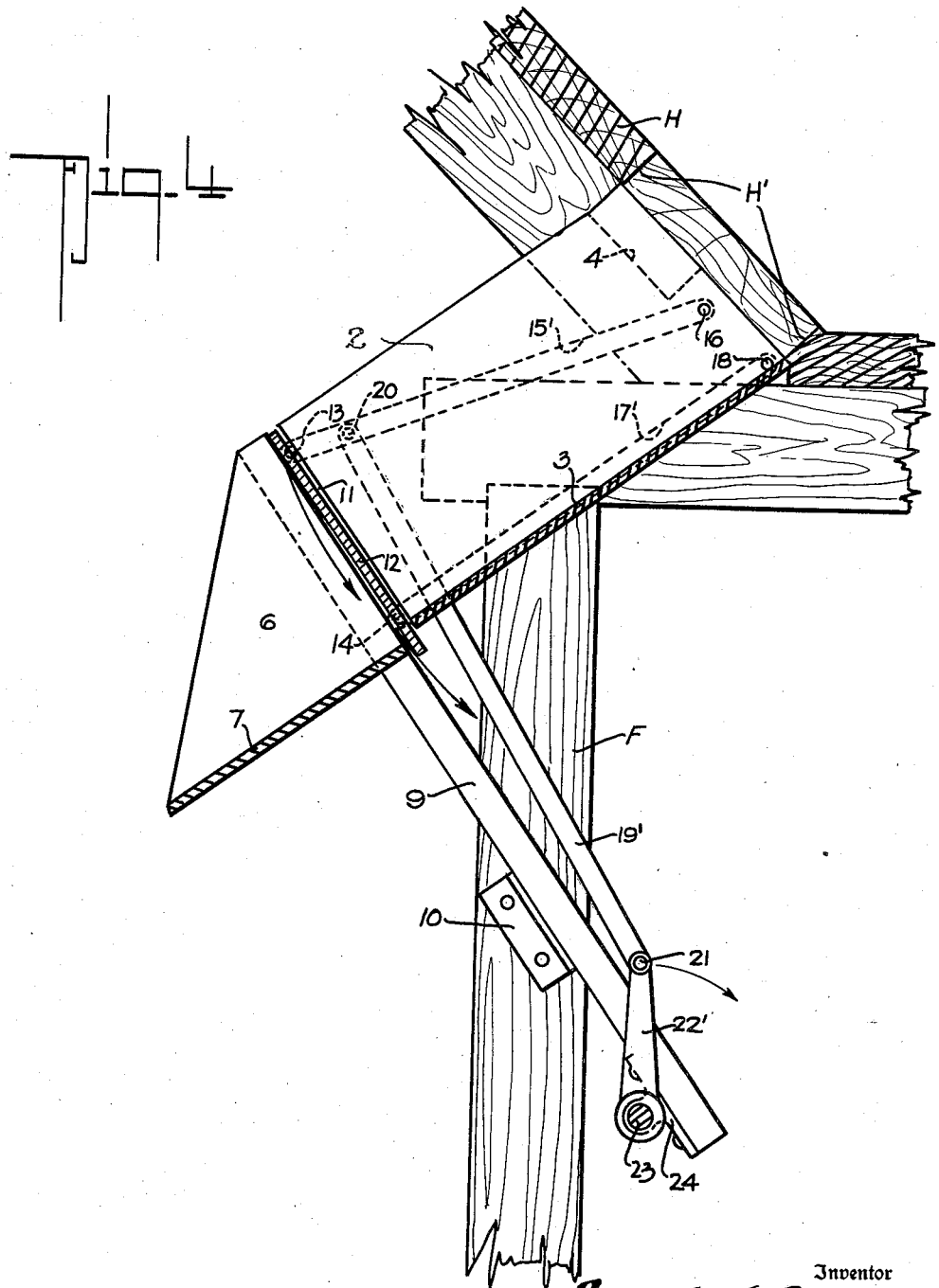

Patented June 20, 1939

2,163,061

UNITED STATES PATENT OFFICE 2,163,061

CHUTE AND VALVE

Royal N. Riblet, Spokane, Wash.

Application November 1, 1937, Serial No. 172,182

7 Claims. (Cl. 193—4)

My present invention relates to an improved chute and valve of the dispensing, hopper discharging, reciprocating valve type, which while specially adapted for use in loading ore from bunkers or bins into mine cars, is also well suitable for handling coal and other similar bulk materials that are to be dispensed from hoppers or storage receptacles. An object of the invention is to provide the chute with a cut-off valve or gate of the free-swinging or floating reciprocable type that operates with facility and smoothness to open or dumping position and to closed or loading position in its relation to the chute. Due to the arrangement of the spaced pivots or hinges that suspend the gate, the latter is operable to open the chute for releasing a load, and to close the chute to back up a load, without causing abrasive or wearing-contact of the gate with the walls at the mouth of the chute, thereby prolonging the durability of both the gate and the chute, and insuring smooth operations in the movement of the gate.

The gate-valve forms a substantial closure for controlling the gravity-flow of material in the inclined chute, and the chute is preferably provided with a spaced extension or discharge-spout for the material, which forms a transversely extending closure-slot in the chute, or at the mouth of the chute, for the reception of the gate-valve when the latter is in closed position.

In the accompanying drawings I have illustrated one complete example of the physical embodiment of my invention, utilizing a hand lever for operating the gate, but it will be understood that the gate-operating means may be power-operated, and various other changes and alterations may be made in the exemplifying structures of the drawings, within the scope of my claims, without departing from the principles of my invention.

The invention consists essentially in certain novel combinations and arrangements of parts involving the gate and its operating means and the chute, as will hereinafter be more fully set forth and claimed.

Figure 1 is a sectional view of a portion of a discharging hopper or storage bin, and showing also the valved chute of my invention mounted in operative relation to the hopper, the full lines showing the valve or gate in closed position, and dotted lines indicating the open position of the gate and its operating means.

Figure 2 is a top plan view showing a lateral portion of the chute and its extension or discharge spout, with the gate in closed position.

Figure 3 is a perspective view of the swinging-gate with its pairs of suspending or swinging-arms, and operating links.

Figure 4 is a vertical sectional view through the chute and the closed gate.

In order that the general arrangement and utility of parts may readily be understood I have shown a portion of a hopper H supported on the frame F, and the bottom of the hopper is provided with a discharge opening H' which feeds the material into the chute that is preferably inclined to cause a gravity-flow of the material through the chute.

The inclined chute is fashioned with spaced side walls 1 and 2 and the bottom 3, and the chute is attached at its upper end by means of angle plates 4 and bolts 5 to the walls of the hopper, about its mouth or discharge opening.

The inclined chute is fashioned with an extension or discharge spout 6 having its bottom 7 inclined in a plane parallel with the bottom of the chute, but located below the chute-bottom, and the side walls of the spout are preferably spaced a little wider apart than the side walls of the chute. The extension is thus a little deeper and a little wider than the chute so that the material may flow by gravity, and without obstruction when the gate is open, down the inclined chute and its extension for loading or emptying into a receptacle, as a mine car when ore is handled. The extension or discharge spout is rigidly mounted with relation to the chute, by means of bracket arms 8, 8, preferably welded to the outer faces of the side walls 1 and 2 at their upper edges, and these bracket arms are attached to the discharge spout by means of bolts 8' which also pass through and attach the upper ends of angle-iron strips or braces 9 to the spout.

The angle-iron braces 9, 9, at each side of the spout extend downwardly and rearwardly across posts of the frame F, and by means of angle plates 10, the braces are bolted to the posts for rigidly supporting the discharge spout, and also to aid in supporting the mouth-end of the chute.

The mouth-end of the chute and the inlet end of the adjoining discharge-spout are spaced apart to form a closure-slot 11, and the rectangular plate 12 forming the valve or gate is designed to slip into and out of this slot for closing and opening the mouth of the chute.

In closed position the gate is suspended transversely of the chute and perpendicular to the planes of the bottoms of the chute and discharge spout, and the gate is larger in length and depth than the mouth of the chute in order to completely close the mouth of the chute when the gate is closed. The gate swings downwardly and rearwardly in its opening movement, and upwardly and forwardly in its closing movement to occupy the closure-slot 11 and cut off the flow of material from the chute. The gate swings down to open position, with its upper edge occupying the space between the front edge of the bottom of the chute and the rear edge of the bottom of the discharge spout, thus effectively closing the bottom of the slot against leak, or waste of material, when the gate is opened. The difference in dimensions between the front edges of the side walls of the chute and the rear edges of the side walls of the discharge spout, provides an arrangement that prevents leaks or waste of material at the sides of the mouth of the opened chute.

As best seen in Figure 3 the gate is fashioned with an upper pair of laterally projecting studs 13, 13, and a similar, lower pair of alined studs 14, 14. The upper pair of studs 13 form pivotal supports for a pair of side-arms 15, 15' disposed at the outer sides of the chute, these studs or pivotal supports as shown being located near the upper edge of the gate, and when the gate is closed these pivotal supports are positioned near the upper edge of the chute. The side arms 15, 15', extend diagonally of the chute, to the rear, and at 16 they are hinged to the exterior sides of the chute, the location of the hinge 16 being in a plane below the plane of the pivot 13.

A second pair of side arms 17 and 17' disposed at the exterior outer or opposite sides of the chute, below the arms 15 15' are employed in suspending the gate, and these arms 17 17' which are longer than the diagonal arms 15, 15', extend in a plane substantially parallel with the bottom of the chute, toward the rear of the chute, where they are hinged at 18, 18, to the chute.

This diagonal arrangement of the upper side arms, and the arrangement of the lower arms with a longer radius than that of the diagonal arms insures a substantially straight movement of the gate while passing into and out of the closure slot, and these arrangements of the pivots and hinges of the gate permit the latter to assume a straight closed-position perpendicular to the bottom of the chute, for an effective closure of the mouth of the chute. As the gate is withdrawn from the slot, the arrangement of the pivots 13, 14 and hinges 16, 18, provides for a backward tilting of the gate with an upward and rearward swing of the lower edge of the gate, thereby swinging the upper edge of the gate into position for effective closure of the bottom of the closure slot, when the gate is in open position.

For operating the gate I provide a pair of side links 19 and 19' that are pivoted at their upper ends at 20 near the free ends of the diagonal arms 15 and 15', and these links extend downwardly and rearwardly, and they are pivoted at 21 to a pair of crank arms 22, 22' mounted on a rock shaft 23 that is journaled in bearings 24 fixed to the angle braces 9.

The rock shaft or crank shaft 23 is turned by manipulation of a hand lever 25 fixed to the shaft, and turned as indicated by full lines and dotted lines in Figure 1 through an arc of approximately ninety degrees to open and close the gate. Suitable means may be employed for retaining the lever and shaft in desired position, as for instance a stop-pin 26 may be passed through a selected hole 27 in a retaining plate 28 in Figure 1, to hold the gate in either closed or open position.

In lieu of the hand-lever I may employ power-operated means for turning the crank shaft, in which event the power-operated means may be controlled in suitable manner as desired.

As thus constructed and operated, the gate 5 may quickly be dropped from the closure slot, only the required distance to clear the chute so that the load may be emptied by gravity, and the upper edge of the gate, forming a continuation of the closed bottoms between the chute and the spout, prevents material loss of the load. In its closing movement, the maximum distance traveled by the gate is substantially the height of the gate, and it will be apparent that this opening and closing may be varied by varying the length of stroke of the lever 25 or the crank arms 22, 22'. Thus the gate, instead of occupying the full closure slot, when closed, may project a quarter, a half, or three quarters the height of the chute, depending on the size of the load to be discharged, and under such circumstances, the travel of the gate will be varied for the purpose.

Having thus fully described my invention, what I claim as new and desire to secure by Letters Patent is:

1. The combination with a chute having an open mouth, of a gate extending transversely of the chute and closing its mouth, a pair of diagonally extending side bars pivoted to the upper portion of the gate and hinged to the chute, a second pair of side bars in a plane substantially parallel with the bottom of the chute pivoted to the lower portion of the gate and hinged to the chute at a point spaced from the hinge point of the first mentioned pair of side bars, and operating means connected to one of said pairs of bars.

2. The combination with a chute having an open mouth, and a transversely extending gate closing said mouth, of an upper pair of diagonally extending side arms pivoted to the gate and hinged to the chute intermediate the upper and lower edges thereof, a lower pair of longer side arms pivoted to the gate and hinged to the chute adjacent the lower edge thereof, a pair of operating links connected to one pair of arms, and lever-mechanism connected with said links for operating the gate.

3. The combination with a chute having an open mouth, and a transversely extending gate perpendicular to the bottom of the chute and closing its mouth, of an upper pair of diagonally extending side arms pivoted to the gate and hinged to a stationary support, a lower pair of side arms extending substantially parallel with the bottom of the chute pivoted to the gate and hinged to a stationary support at a point spaced from the hinge point of the first mentioned pair of said arms, and gate-operating means pivotally connected to one of said pairs of arms.

4. The combination with a chute having an open mouth, and a transversely extending gate closing its mouth, of suspending means hinged to a stationary support and pivoted to the upper portion of the gate, a second suspending means pivoted to the lower portion of the gate and hinged to a stationary support at a point spaced from the hinge point of the first mentioned suspending means, and gate-operating means pivotally connected to one of said suspending means.

5. The combination with an inclined chute having a rigid, spaced discharge-spout forming a transversely extending closure slot, and a gate occupying said slot, of suspending means pivoted to the upper portion of the gate and hinged to a stationary support, a second suspending means having a longer radius pivoted to the lower portion of the gate and hinged to a stationary support at a point spaced from the hinge point of the first mentioned suspending means, and gate-operating means pivotally connected with one of said suspending means.

6. The combination with an inclined chute having a rigid, spaced discharge-spout forming a transversely extending closure-slot perpendicular to the bottom of the chute, of an upper pair of diagonal side arms pivoted to the gate and hinged to the chute, a lower pair of longer side arms pivoted to the gate and hinged to the chute at a point spaced from the hinge point of the first mentioned pair of side arms, a pair of links connected to the diagonal arms, and gate-operating mechanism connected with said links.

7. The combination with an inclined chute having a rigid spaced discharge-spout forming a transversely extending closure-slot perpendicular to the bottom of the chute, of an upper pair of diagonal side arms pivoted to the gate, a lower pair of longer side arms pivoted to the gate, and said pairs of side arms hinged at spaced points to the chute, a pair of links connected to the diagonal arms, and gate-operating mechanism connected with said links.

ROYAL N. RIBLET.